United States Patent [19]

Grant

[11] 4,455,815

[45] Jun. 26, 1984

[54] TREE TRIMMING APPARATUS

[76] Inventor: Spencer H. Grant, 1220 Millers Mill Rd., Stockbridge, Ga. 30281

[21] Appl. No.: 348,493

[22] Filed: Feb. 12, 1982

[51] Int. Cl.$^3$ .......................................... A01D 55/18
[52] U.S. Cl. ......................................... 56/235; 56/237
[58] Field of Search .............................. 56/233–237, 56/DIG. 4

[56] References Cited

U.S. PATENT DOCUMENTS

| 1,857,342 | 5/1932  | Albrecht .................... | 56/237   |
| 1,866,380 | 7/1932  | Wagner ...................... | 56/DIG. 4 |
| 1,869,394 | 8/1932  | Sikma ........................ | 56/235   |
| 3,415,046 | 12/1968 | Leydig et al. ................ | 56/235   |
| 3,433,005 | 3/1969  | Deigaard et al. .............. | 56/235   |
| 4,174,604 | 11/1979 | Wilson, Sr. et al. ........... | 56/237   |
| 4,355,497 | 10/1982 | Murphy ....................... | 56/235   |

FOREIGN PATENT DOCUMENTS

| 2651425 | 9/1978 | Fed. Rep. of Germany ........ | 56/237 |
| 184264  | 6/1887 | France ....................... | 56/233 |
| 190720  | 5/1888 | France ....................... | 56/233 |
| 868     | of 1890 | United Kingdom ............. | 56/236 |
| 564073  | 9/1944 | United Kingdom .............. | 56/235 |

OTHER PUBLICATIONS

An Electrically Driven Hedge Trimmer, A. E. Shaw, Popular Mech., 1923.

Primary Examiner—Paul J. Hirsch
Attorney, Agent, or Firm—B. J. Powell

[57] ABSTRACT

Tree trimming apparatus adapted to be manually controlled by an operator including a support frame with ground engaging wheel means and manually engageable handle means so that the operator can grasp the handle means to support the apparatus in combination with the wheel means and to guide the apparatus, mast means mounted on the support frame and extending upwardly and outwardly therefrom and mounting cutter means adapted to trim a tree as the operator guides the apparatus around a tree.

4 Claims, 3 Drawing Figures

TREE TRIMMING APPARATUS

BACKGROUND OF THE INVENTION

This invention relates generally to tree trimming apparatus and more particularly to a self-propelled tree trimming apparatus which is guided around the tree by an operator.

It is necessary to periodically trim or prune growing trees to obtain the desired shape of the tree. This is espeically true with trees such as Christmas trees which need to have a prescribed shape for sale.

Various tree trimming apparatus have been used to trim trees. In one type, the tree trimming apparatus is totally supported by the operator who supports and guides the cutting means to trim the tree. One of the primary problems with hand-held tree trimming apparatus is that it is difficult to maintain uniformity in the trimmed tree and to trim the tree at a desired angle. Machine mounted tree trimming apparatus have also been proposed such as those disclosed in U.S. Pat. Nos. 2,940,486; 3,330,068; 3,496,709; 3,597,908; 3,888,071; and 3,913,304. One of the major problems with machine mounted tree trimming apparatus is that the apparatus is so large it is difficult to gain access to the trees for trimming when the trees are planted on standard spacing. This is especially true for Christmas trees. Another problem with such machine mounted tree trimming apparatus is that it is time consuming to set up the apparatus for trimming the tree to assure uniform tree trimming and to maintain the desired trimming angle. Another problem with prior art machine mounted trimming apparatus is that they are complex and expensive to manufacture. As a result, prior art machine mounted tree trimming apparatus have not found widespread use, especially in the growing and trimming of Christmas trees.

SUMMARY OF THE INVENTION

These and other problems and disadvantages associated with the prior art are overcome by the invention disclosed herein by providing a tree trimming apparatus which is sufficiently compact to allow access to be gained to trees planted on standard spacing such as those associated with the growing of Christmas trees and which assures that the tree will be uniformly trimmed at the desired angle. Further, the tree trimming apparatus is simple in construction, thereby making it economically feasible for operation to trim trees such as Christmas trees. The tree triming apparatus is constructed to assure uniform trimming even though the terrain on which the trees are growing may not be level and to permit the operator to easily control the apparatus so that the trees will be properly trimmed.

The apparatus of the invention includes generally a support frame mounted on ground engaging wheel means to roll along the ground together with a manually engageable handle means so that an operator can grasp the handle means to support the support frame in combination with the wheel means and guide the tree trimming apparatus. Mast means is mounted on the support frame and extends upwardly and outwardly from one side of the wheel means and is provided with cutter means adapted to trim a tree as the operator guides the tree trimming apparatus around the tree. The cutter means also includes a basil cutter which trims the bottom of the tree as well as weeds and grass around the base of the tree. Drive means is provided for propelling the tree trimming apparatus around the tree so that the operator only has to guide the tree trimming apparatus as it moves around the tree. An appropriate power source such as a battery is provided for powering the cutter means and the drive means.

These and other features and advantages of the invention disclosed herein will become more apparent upon consideration of the following specification and accompanying drawings wherein like characters of reference designate corresponding parts throughout the several views and in which:

Figure 1:
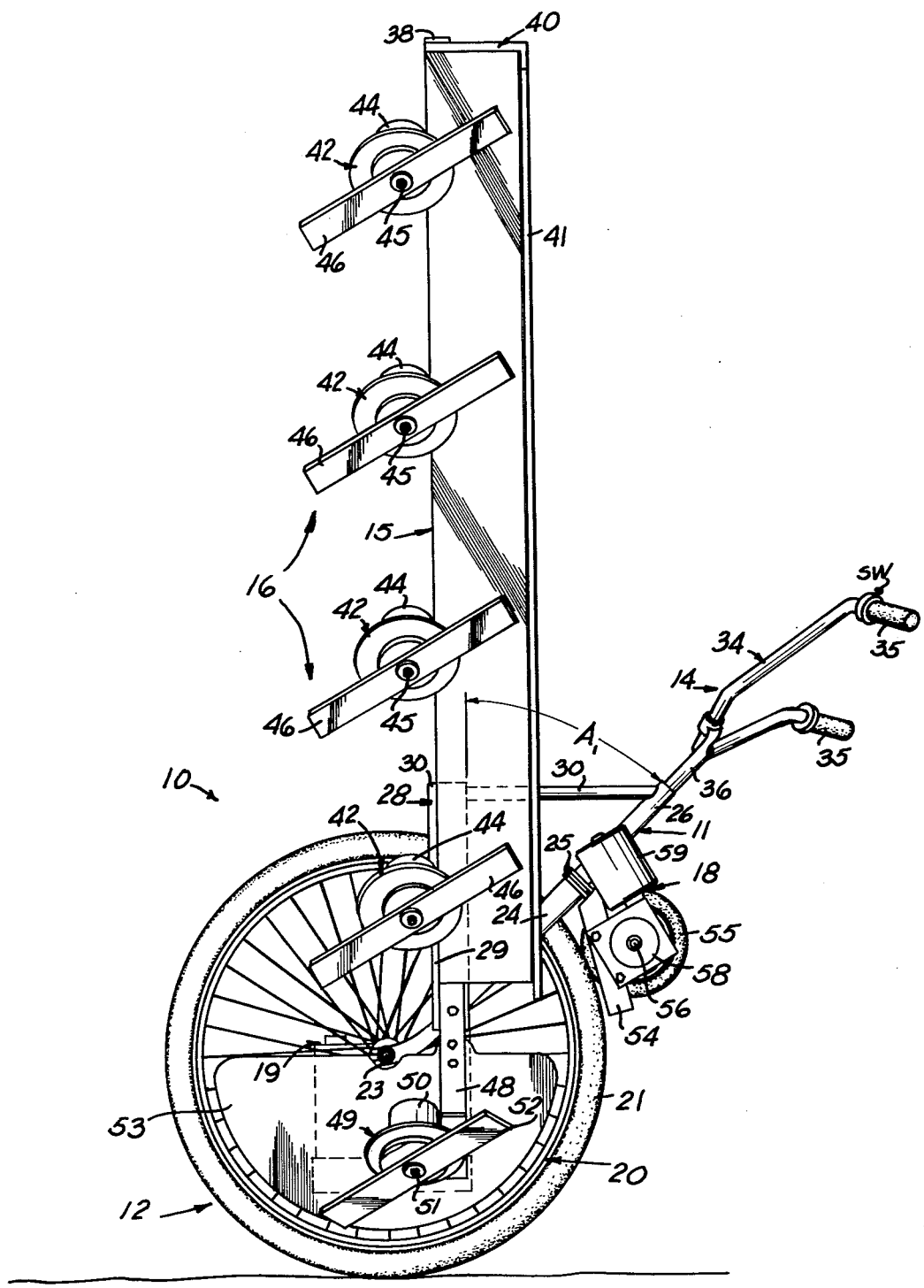
FIG. 1 is a side elevational view of the tree trimming apparatus incorporating the invention.

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Referring to the drawings, it will be seen that the tree trimming apparatus 10 includes generally a support frame 11, a ground engaging wheel means 12 rotatably mounted in the support frame about a horizontal axis $A_R$, a manually engageable handle means 14 on the support frame so that an operator can grasp the handle means to support the support frame in combination with the wheel means and guide the tree trimming apparatus, mast means 15 mounted on the support frame and extending upwardly and outwardly therefrom on one side of the wheel means 12, and cutter means 16 mounted on the mast means and adapted to trim a tree as the operator guides the tree trimming apparatus around the tree. The tree trimming apparatus 10 also includes a drive means 18 for drivingly engaging the wheel means 12 to propel the tree trimming apparatus around the tree. A power source 19 is also provided for powering the cutter means 16 and drive means 18.

The tree trimming apparatus 10 is designed primarily for trimming small trees such as Christmas trees so that the trees have the desired overall shape. As the operator guides the trimming apparatus 10 around the tree, the cutter means 16 trims the tree at the desired angle to produce its desired shape. As will become more apparent, the construction of the tree trimming apparatus permits the tree to be trimmed at a uniform angle therearound and is sufficiently compact and maneuverable so that the apparatus can be used in stands of small trees planted on standard spacing without damage to the trees.

Figure 2:
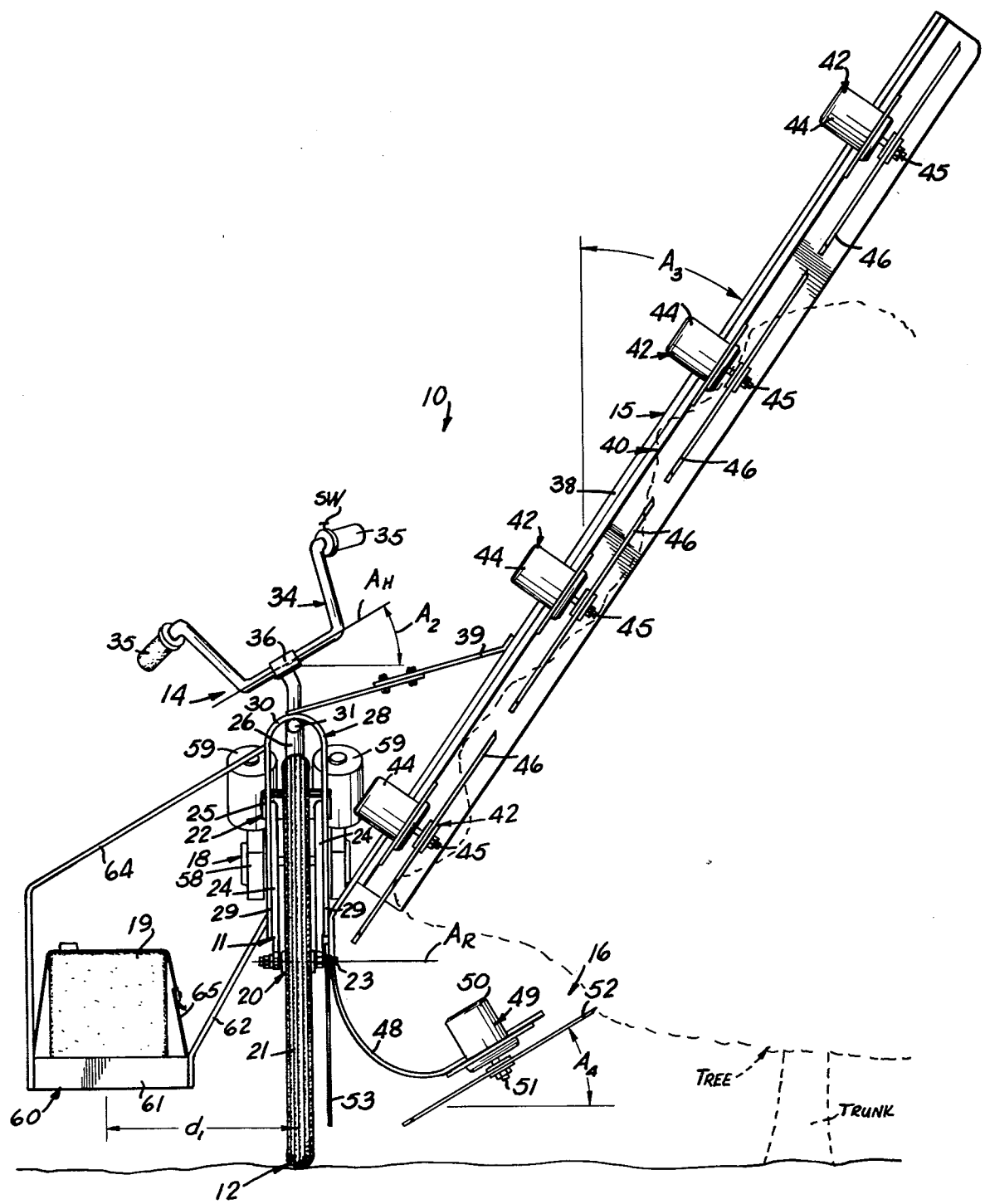
FIG. 2 is a front view thereof.

As best seen in FIGS. 1 and 2, the ground engaging wheel means 12 includes a wheel 20 which mounts a pneumatic tire 21 thereon. While different wheel means may be used, the wheel means 12 illustrated in FIGS. 1 and 2 is a bicycle wheel and tire equipped with a mounting axle 23 for use in attaching the wheel 20 to the frame 11.

The support frame 11 includes a bicycle fork 22 which is connected to the wheel 20 so that the wheel 20 is rotatably mounted thereon. The bicycle forks 22 has a pair of side tubes 24 that extend from the center of the wheel 20 out past the tire 21 on opposite sides thereof. Cross pieces 25 connect the side tubes 24 outboard of the tire 21 and a guide tube 26 is mounted on the cross pieces 25 so that it extends outwardly therefrom generally in alignment with the side tubes 24. An inverted U-shaped member 28 is connected to the fork 22. The depending legs 29 of the U-shaped member 28 extend on opposite sides of the wheel 20 and are connected to the side tubes 24 while the central portion 30 of member 28 connecting the upper ends of the legs 29 is connected to the guide tube 26 on the fork 22 by brace member 31. This angularly locates the U-shaped member 28 and the fork 22 with respect to each other to define an included angle $A_1$ therebetween. When the frame 11 is in operative position, the U-shaped member 28 is generally vertically oriented while the fork 22 extends outwardly from the center of the wheel 20 at the angle $A_1$ from the vertical.

The handle means 14 includes a handle bar 34 provided with a pair of spaced apart hand grips 35. The handle bar 34 is connected to the outer end of the guide tube 26 by a connector 36 of the type used to connect bicycle handle bars to the fork. The connector 36 allows the handle bar 34 to be rotated about the axis of the guide tube 26 and also rotate about the axis of the central section of the handle bar 34 connected to the connector 36. The handle bar 34 is rotated through connector 36 so that the handle bar axis $A_H$ through the central section thereof connected to the connector 36 is shifted with respect to the horizontal by the angle $A_2$ as best seen in FIG. 2. The angle $A_2$ is selected so that the operator guiding the trimming apparatus 10 by holding the hand grips 35 walks along the track of the tire 21 as the apparatus moves around the tree being trimmed. This allows the operator and the tire 21 to move along the same diameter circle about the tree being trimmed and facilitates the control of the tree trimming apparatus as will become more apparent. The particular handle bar 34 illustrated is of the drop center type so that, as the handle bar 34 is rotated about its axis $A_H$ in connector 36, the height of the hand grips 35 with respect to the ground can be changed to accommodate different height operators. The handle bar 34 is rotated to the appropriate angle so that, when the operator is comfortably holding the tree trimming apparatus 10 by the hand grips 35, the U-shaped member 28 will be generally vertically oriented as will become more apparent.

The mast means 15 includes an elongate support bar 58 which is connected to one of the legs 29 of U-shaped member 28 adjacent the side tube 24 on the fork 22 and extends upwardly and outwardly therefrom as best seen in FIG. 2. The support bar 38 is connected to the central portion 30 of the U-shaped member 28 by an adjustable link 39 so that the angle $A_3$ as seen in FIG. 2 of the support bar 38 with respect to the vertical can be adjusted. It will be appreciated that the support bar 38 when viewed as seen in FIG. 1, lies in generally a vertical plane when it is in operative position with the U-shaped member 28 located generally vertically. The support bar 38 is provided with a guard 40 which extends rearwardly thereof and is provided with an outwardly directed flange 41 to protect the operator from the cutter means 16 as will become more apparent.

The cutter means 16 includes a plurality of cutter heads 42 mounted on the support bar 38 at longitudinally spaced apart positions therealong. Each of the cutter heads 42 includes a drive motor 44 mounted on the support bar 38. The outwardly directed drive shaft 45 of motor 44 is oriented normal to bar 38 and mounts an elongate cutter blade 46 on the outwardly projected end thereof outboard of the guard 40 so that the cutter blade 46 passes within the guard and just forwardly of the flange 41 as it is rotated by the drive motor 44. The cutter heads 42 are spaced along the support bar 38 so that the cutting circle defined by the cutter blades 46 lie generally in an end-to-end fashion along the length of the mast means 15. The particular drive motors 44 illustrated are direct current motors so that they can be driven from a battery as will become more apparent. The drive motors illustrated rotate the cutter blades 46 at rotational speeds of about 3,000 rpm although other rotational speeds may be selected.

The lower end of the support bar 38 extending below the connection of the support bar 38 to the leg 29 on the U-shaped member 28 is curved outwardly from the wheel 20 to mount the basil cutter head 49 thereon. The basil cutter head 49 has a construction similar to that of the cutter heads 42 with a drive motor 50 whose drive shaft 51 mounts cutter blade 52 on the downwardly projecting end thereof. This locates the cutter blade 52 at an angle $A_4$ with respect to the ground so that the cutter blade 52 is located between the wheel means 12 and the base of the tree. Thus, as the cutter blades 46 on the cutter heads 42 trim the sides of the tree, the cutter blade 52 trims the branches at the base of the tree to give ground clearance around the trunk of the tree. It will be appreciated that the cutter blade 52 is located so that the branches at the base of the tree are cut as the cutter blade 52 moves through the outermost portion of the cutting circle of the blade 52 while the cutter blade 52 trims the grass around the base of the tree as the cutter blade 52 moves through the innermost portion of the cutting circle of the blade 52. A wheel guard 53 is mounted between the basil cutter head 49 and wheel 20 to protect same.

The drive means 18 is adapted to engage the periphery of the tire 21 to rotate the wheel means 12 and propel the tree trimming apparatus over the ground. The drive means 18 is mounted on a subframe 54 connected to the fork 22 and projecting therefrom over the tire 21. A drive wheel 55 is rotatably mounted on the subframe 54 so that the periphery of the drive wheel 55 engages the periphery of the tire 21. Opposite ends of the support axle 56 mounting the drive wheel 55 are mounted between a pair of gear boxes 58, each of which mounts a propulsion motor 59 so that the propulsion motors 59 drive the drive wheel 55 through gear boxes 58 in a clockwise direction as seen in FIG. 1. This in turn causes the drive wheel 55 to drive the tire 21 in a counterclockwise direction as seen in FIG. 1 to propel the tree trimming apparatus 10 to the left as seen in FIG. 1. This allows the operator to simply support the handle bar 34 and guide the apparatus around the tree being trimmed. It has been found that, if the operator has to push the apparatus around the tree, there is a tendency for the operator to raise and lower the handle bar so as to shift the cutter means 16 forwardly and rearwardly of the vertical to change the desired tree profile. The use of drive means 18 eliminates this problem. It will be appreciated that the torque exerted on the wheel means 12 by drive means 18 always forces the handle bar 34 downwardly to facilitate the operator supporting the handle bar at a constant level.

The frame 11 also includes battery support subassemblies 60 mounted on the U-shaped member 28 and projecting outwardly therefrom opposite the mast means 15. The subassembly 60 includes battery box 61 whose inside edge is connected to the leg 29 on the U-shaped member 28 by an inner strap member 62 and whose outside edge is supported by an outer strap member 64 extending from the central portion 30 of the U-shaped member 28. The battery box 61 defines an upwardly opening recess therein to receive the power source 19 therein.

The particular power source 19 illustrated is a 12 volt battery of the automotive type. Appropriate holddown members 65 may be provided on battery box 61 to keep the battery 19 in place. It will be seen that the battery 19 is located outwardly of the wheel 20 by the distance $d_1$ so that the weight of the battery 19 offsets the combined weight of the mast means 15 and cutter means 16 when the wheel means 12 is vertically oriented. This facilitates the control of the tree trimming apparatus 10 since the operator simply keeps the weights of the mast means 15 and cutter means 16 balanced with the weight of the battery 19 during use. As long as this balanced position is maintained, the angle of the cutting planes of the cutter blades 46 will be maintained at the desired angle at which the tree is to be trimmed.

It will be appreciated that the angle at which the trees are trimmed may increase as the trees grow larger. This also requires additional cutting heads 42 to be added to the mast means 15 through an appropriate extension in order to trim the tree for the additional height. Some trees are trimmed after about two years of growth so that the included angle of the tree after it is trimmed is about 60° and are again trimmed after about four years of growth with an included angle after the tree is trimmed of about 45°. This change of angle can be accommodated by adjusting the adjustable link 39 connecting the support bar 38 to the U-shaped member 28. Typically, the distance between the battery and the wheel means 12 does not have to be changed as the angle of the mast means 15 is changed since the additional weight of the additional cutter heads 42 added maintains about the same side loading on the wheel means 12 to be offset by the battery 19 as the mast means 15 with the fewer cutter heads 42 thereon.

To provide an adjustment of the offsetting forces exerted on frame 10 by the mast means 15, cutter means 16, and battery 19, the battery box 61 may be made wider than the battery 19 as illustrated in FIG. 2. This allows the battery 19 to be shifted toward and away from wheel means 12 to change the counterbalancing force exerted thereon. The holddown members 65 may be adjusted to keep the battery 19 in any selected position in battery box 61.

To operate the tree trimming device 10, the operator simply grasps the hand grips 35 and supports them at a comfortable height. The adjustment of the handle bar 34 will already have been adjusted so that when the operator supports the hand grips 35 at a comfortable height, the U-shaped member 28 will be generally vertically oriented. The operator then supports the hand grips 35 to keep the side loadings on the apparatus 10 balanced. This automatically maintains the cutter blades 46 on the cutter heads 42 at the proper angle for trimming a tree. It will be appreciated that trees grow generally vertically regardless of the ground angle. Thus, as the operator maintains the trimming apparatus 10 at a balanced position, the cutter heads 42 will trim the tree at the desired angle since the angle of the cutter heads will be maintained at the same angle with respect to the vertical regardless of the ground angle. The operator then operates an appropriate switch SW mounted on one of the hand grips 35 to electrically connect the cutter motors 44 and 50 and the propulsion motors 59 to the battery 19. Thus propulsion motors 59 drive the apparatus 10 forwardly while motors 44 and 50 drive cutter blades 46 and 52. The operator then guides the wheel means 12 around a circle centered on the trunk of the tree and at the proper distance from the trunk of the tree to affect the trimming of the tree. Since the operator can walk along the track of the wheel means 12, the circle around the tree along which the trimming apparatus 10 moves can be easily maintained.

It will also be appreciated that where the ground is level, a plurality of wheels may be used as the wheel means 12 in lieu of the single wheel 20 illustrated. The plurality of wheels would be oriented along a common rotational axis so that the mast means 15 and the power source 19 would be located similarly to that described for that embodiment of the invention shown in FIGS. 1 and 2.

While rotary cutters have been disclosed for cutter means 16, it will be appreciated that other types of cutters may be used such as reciprocating sickle type cutters without departing from the scope of the invention. Likewise, alternate power sources may be used in lieu of battery 19 to power the cutter means 16.

Figure 3:
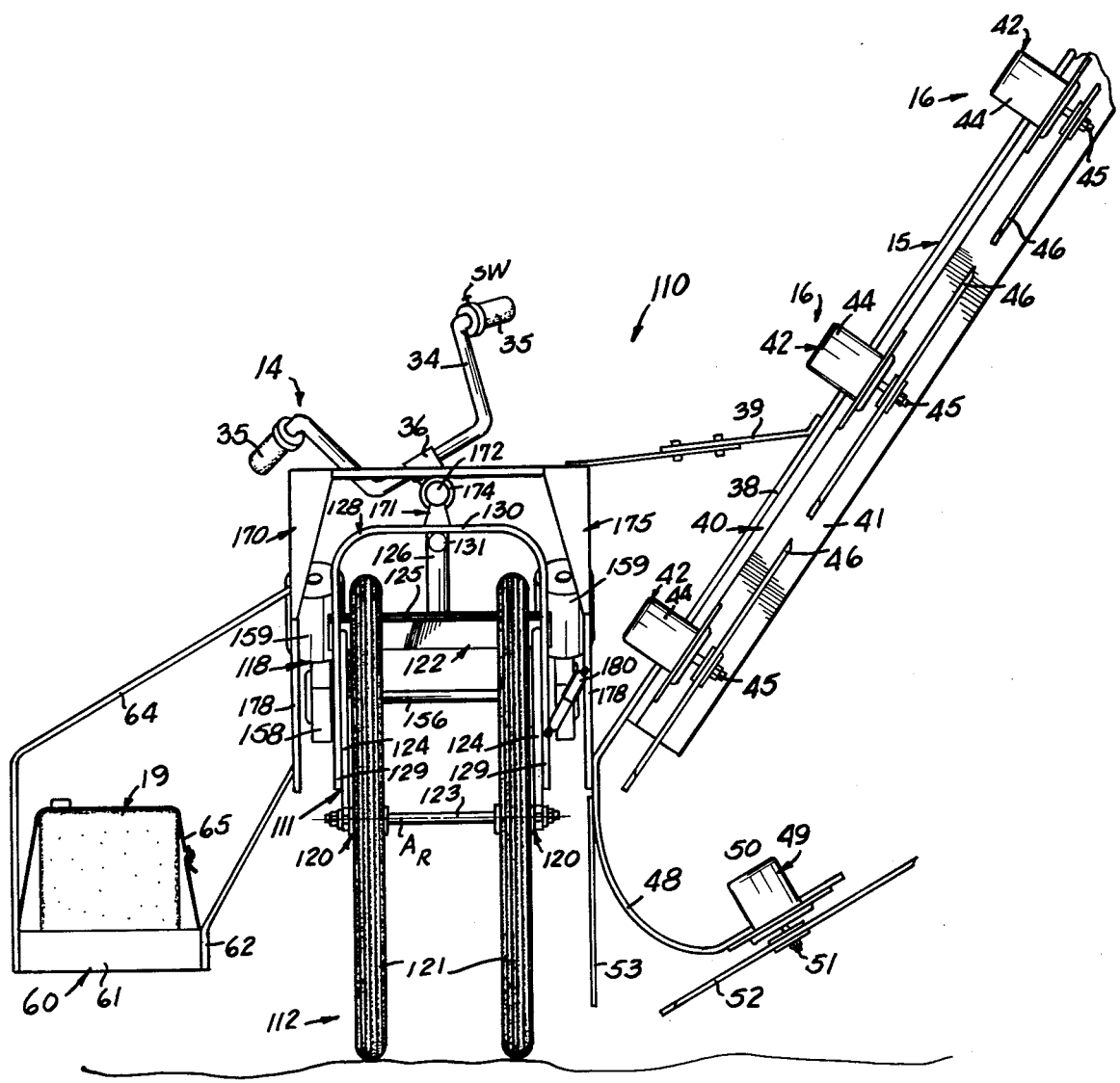
FIG. 3 is a front view of a second embodiment of the apparatus of the invention.

It may be desirable to mount the tree trimming apparatus 10 using a plurality of wheels for the wheel means 12 and still obtain the automatic alignment capability to maintain the same angle of the mast means 15 and cutter means 16 as the tree trimming apparatus is moved around the tree. FIG. 3 shows a second embodiment of the tree trimming apparatus which has been designated 110 that incorporates this feature. The wheel means 112 includes a pair of spaced apart wheels 120 mounted on a common axle 123 for rotation of both of the wheels 120 about a common rotational axis $A_R$. Each of the wheels 120 has a pneumatic tire 121 thereon that rolls along the ground.

The support frame 111 includes a fork 122 with a pair of side tubes 124 that extend along the outside of both of the wheels and are connected to the axle 123 at the opposite ends thereof. Cross pieces 123 connect the side tubes 124 outboard of the tires 121 and a guide tube 126 is mounted on the cross pieces 125 centrally between the side tubes 124 so that the guide tube 126 extends outwardly from the cross pieces 125 generally in axial alignment with the side tubes 124. The side tubes 124 on the fork 122 are connected by an inverted U-shaped member 128 whose depending legs 129 extend downwardly on opposite sides of the wheels 120 and are connected to the side tubes 124 at their lower ends. The central portion 130 of the member 128 is connected to the guide tube 126 on the fork 122 by a brace member 131. This angularly locates the member 128 and the fork 122 with respect to each other similarly to that described in the first embodiment of the invention so that when the frame 111 is in operative position, the U-shaped member 128 is generally vertically oriented while the fork 122 extends outwardly behind the wheels 120 at an angle similar to the fork 22 in the first embodiment of the invention. The handle means 14 is the same as that described in the first embodiment of the invention and is adjustably connected to the guide tube 126. The same reference numerals applied to the handle means 14 in the first embodiment of the invention have been applied to the handle means 14 of the second embodiment of the invention.

The mast means 15 and the power source 19 of the second embodiment of the invention are connected to the frame 111 by a pivot assembly 170. The pivot assembly 170 includes a pivot bracket 171 which is mounted on top of the central portion of the U-shaped member 128 and includes a horizontally extending axle 172 oriented perpendicular to the rotational axis $A_R$ of the wheels 120 and spaced above the central portion 130 of the member 128. A pivot collar 172 is rotatably mounted around the axle 172 so that the collar 174 can pivot about the axis of the axle 172. An inverted U-shaped pivot member 175 is mounted on the collar 174 with its central section 176 centered on the collar 174 and projecting outwardly on opposite sides thereof. The legs 178 on member 175 extend downwardly from the central portion 176 and are spaced outwardly from the legs 129 of the U-shaped member 128 so that the legs 178 on the pivot member 175 can shift toward and away from the legs 129 on the member 128 as the pivot member 175 pivots with respect to the axle 174.

The support bar 38 on the mast means 15 is connected to the lower end of one of the legs 178 on the pivot member 175 adjacent its lower end on one side of the wheels 120 with the central portion 176 of the pivot member 175 connected to the support bar 38 by the adjustable link 39 so that the angle of the support bar with respect to the vertical can be adjusted.

The battery support subassembly 60 is mounted on the opposite leg 178 of the pivot member 175 so that the weight of the battery 19 offsets the combined weight of the mast means 15 and cutter means 16 when the pivot member 175 is vertically oriented. Thus, the proper angle of the cutter means 16 with respect to the vertical will be maintained even though the wheels 120 may roll along an angled terrain since the pivot member 175 will automatically pivot to keep it vertically oriented. To prevent the mast means 15 from unnecessarily swinging as the pivot member 175 pivots, an appropriate shock absorber 180 may be used to connect the pivot member 175 to the member 128 to reduce this tendency.

The drive means 118 is similar to the drive means 18 and includes a pair of drive wheels mounted on common support axle 156 to drivingly engage both tires 121. Propulsion motors 159 drive axle 156 through gear boxes 158 similarly to the first embodiment of the invention.

The operator uses the trimming apparatus 110 similarly to apparatus 10 to trim trees. It will be appreciated that the operator does not have to balance the apparatus 110 as he does the apparatus 10.

What is claimed as invention is:

1. A tree trimming apparatus adapted to be manually controlled by an operator comprising:
   a pair of ground engaging wheels;
   a common axle rotatably mounting both said wheels in spaced apart positions;
   a support frame connected to said common axle;
   handle means mounted on said support frame and adapted to be grasped by the operator so the operator can keep said support frame at a prescribed pivotal position on said axle during operation;
   a pivot axle mounted on said support frame above said wheels and oriented generally normal to said common axle so that said pivot axle is generally horizontal when the operator holds said support frame at said prescribed pivotal position;
   an inverted U-shaped pivot member rotatably mounted around said pivot axle including a pair of legs depending on opposite sides of said wheel;
   a cutter assembly mounted on one of said legs of said pivot member and extending upwardly and outwardly therefrom, said cutter assembly adapted to trim a tree along a cutting plane;
   a power supply mounted on the other of said legs of said pivot member on the opposite side of said wheel from said cutter assembly, said cutter assembly and said power supply arranged so that the respective weights thereof cause said pivot member to be maintained in a prescribed pivotal position on said pivot axle with said cutting plane located at a prescribed angle with respect to the vertical without regard to the angle of said common axle with respect to the horizontal.

2. The tree trimming apparatus of claim 1 further including shock absorbing means interconnecting said support frame and said pivot member to control the rate at which said pivot member pivots with respect to said support frame.

3. The tree trimming apparatus of claim 1 further including drive means for drivingly rotating said wheels.

4. The tree trimming apparatus of claim 3 further including base trimming means for selectively trimming the base portions of the tree.

* * * * *